United States Patent [19]
Dasqupta

[11] Patent Number: 5,447,223
[45] Date of Patent: Sep. 5, 1995

[54] METHOD AND APPARATUS FOR A VERTICAL FLOW MATERIAL WORKING SYSTEM

[75] Inventor: Basab B. Dasqupta, Escondido, Calif.

[73] Assignee: Sony Electronics, Inc., Park Ridge, N.J.

[21] Appl. No.: 217,450

[22] Filed: Mar. 24, 1994

[51] Int. Cl.⁶ .......................................... B65G 21/18
[52] U.S. Cl. ................................................ 198/778
[58] Field of Search ........................................ 198/778

[56] References Cited

U.S. PATENT DOCUMENTS

| | | | |
|---|---|---|---|
| 1,090,948 | 3/1914 | Sklovsky et al. | 198/778 X |
| 3,412,476 | 11/1968 | Astrom | 198/778 X |
| 3,750,859 | 8/1973 | Smith | 198/778 |
| 3,794,156 | 2/1974 | Brackmann et al. | 198/778 |

FOREIGN PATENT DOCUMENTS

| | | | |
|---|---|---|---|
| 0215340 | 3/1987 | European Pat. Off. | 198/778 |
| 0297332 | 1/1989 | European Pat. Off. | 198/778 |
| 0132970 | 10/1979 | Japan | 198/778 |
| 0048805 | 3/1985 | Japan | 198/778 |
| 0598663 | 3/1978 | U.S.S.R. | 198/778 |

*Primary Examiner*—James R. Bidwell
*Attorney, Agent, or Firm*—Wood, Herron & Evans

[57] ABSTRACT

A material working system that includes a material conveyance connected to a support structure. The material conveyance extends adjacent the peripheral boundary of the support structure in a vertically downward direction. A plurality of sources of material and workstations are located at different vertical elevations adjacent the material conveyance.

14 Claims, 1 Drawing Sheet

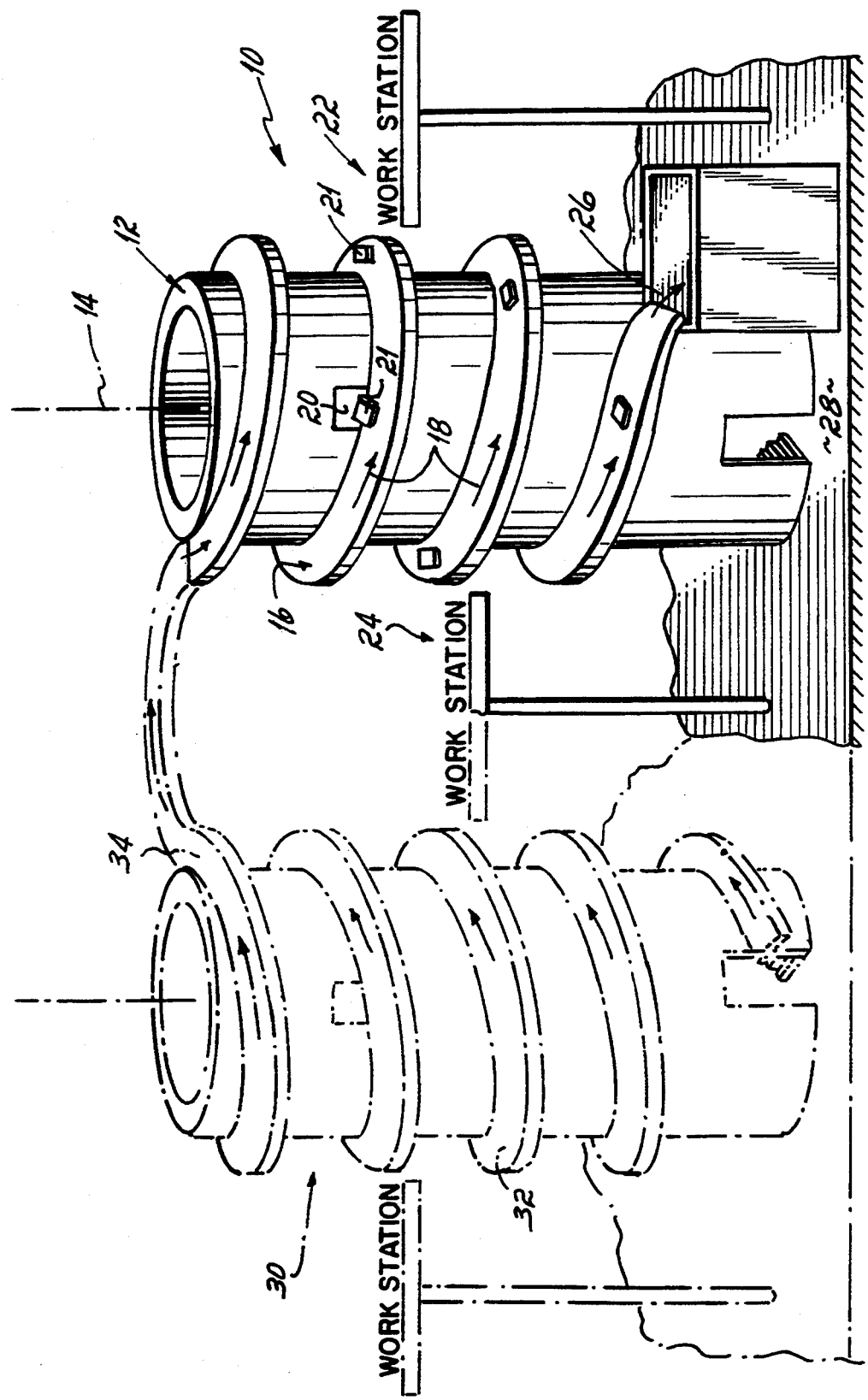

METHOD AND APPARATUS FOR A VERTICAL FLOW MATERIAL WORKING SYSTEM

BACKGROUND OF THE INVENTION

1. Field of the Invention

The present invention relates generally to the area of material working systems and more particularly to a material working system having a generally vertical orientation and a generally vertical material flow path.

2. Description of Related Art

Material working systems of many types and sizes are well known in manufacturing processes, and those systems have certain common elements. Generally, raw materials or processed materials are presented to a predetermined material flow path in a predetermined order that is a function of the material working process being implemented. The material working process may require that the material be altered in size or shape or machined or processed in some other way. Alternatively, a material working process may include the combining of raw or processed materials by assembly, bonding or other means. Generally, the predetermined path defining the material flow within the material working system has generally a horizontal orientation. That is, the predetermined path of material flow extends generally parallel to a horizontal plane such as the floor of a building. Further, material presentation stations and workstations generally have a common elevation with respect to the horizontal plane such as the floor of a building. Given the nature of the structures within which material working systems are installed, it is intuitive to expect the generally horizontal path of material flow.

Within the above material working systems, there are many systems in which the material flow during the working process changes in vertical elevation. For example, the material working system may extend from one floor of a building to another. However, in those cases, the vertical travel of the material working path is simply a connecting link between horizontal paths which contain the sources of material and the workstations at which the material working process is executed.

The known material working systems have a disadvantage in that they utilize extensive floor area within a structure. Further, since the material is generally moving horizontally, the conveyance by which the material is moved must be powered. Therefore, known systems have a further disadvantage of substantial cost because of the power requirements throughout the material flow path.

SUMMARY OF THE INVENTION

To overcome the disadvantages of the above-described devices, an object of the present invention is to provide a material working system which requires less floor space. The present invention comprises a material working apparatus which is generally vertically oriented and in which sources of material and material workstations are at different elevations with respect to the material flow path. The invention further comprises a material working method having a generally vertical material flow. Therefore, the invention is particularly useful where floor space is scarce or has significant value, for example, in those situations where the land for manufacturing purposes has great market value and is expensive to purchase or lease.

According to the principles of the present invention and in accordance with the described embodiments, a material working system has a support structure with a material support connected to the support structure and extending adjacent the peripheral boundary of the support structure such that substantially every point along the material support has a different vertical elevation. The material working system further includes at least one workstation and one source of material adjacent the material support. In further embodiments of the material working system, a plurality of workstations are adjacent the material support, and each workstation has a different vertical elevation. In another embodiment, a plurality of sources of materials are located adjacent the material support, and each of the sources materials has a different vertical elevation. In a still further embodiment, the material support extends along a generally helical path about a substantially vertical axis.

The present invention further provides a method of working material by supplying the material to an entry location, moving the material along a curved path in a generally vertically downward direction from the entry location to an exit location and performing work on the material at a plurality of different vertical locations along the curved path between the entry and the exit locations.

The present invention has the feature of a generally vertical material flow path which has the advantage of providing a material processing system which consumes a relatively small area in a horizontal plane. Therefore, the invention only requires minimal floor space. Further, by having the material flow extend in a generally vertically downward direction, the material may be pulled down the material flow path by the force of gravity. Therefore, the invention has a further advantage of being more energy efficient and therefore less expensive to use.

BRIEF DESCRIPTION OF THE DRAWINGS

The FIGURE is a perspective view of one embodiment of the invention.

DETAILED DESCRIPTION OF THE INVENTION

The FIGURE illustrates one embodiment of a material working system 10 implementing the principles of the present invention. A support structure 12 is a hollow cylindrical structure having a generally vertical central longitudinal axis 14. The support structure 12 must be strong enough to carry and support a material support, for example, a material conveyance, 16 connected to the support structure 12. The material conveyance 16 defines a material flow path 18 substantially every point of which is at a different vertical elevation. Adjacent the material conveyance 16 is a source of material 20. Material 21, for example, a workpiece, is guided by the material conveyance 16 from an entry point at the source 20 in a generally vertically downward direction past workstations 22, 24 to an exit 26 at which point the material 21 leaves the material conveyance. The material working system 10 illustrated in the FIGURE has the advantage of occupying a little floor space in a horizontal plane 28 relative to the length of the material flow path 16.

The support structure 12 may be made of plastic, wood, steel, or any other appropriate material that provides sufficient strength to support the material conveyance 16. The support structure 12 may have solid walls as illustrated or may be a frame structure of beams which provides the necessary structural support but does not have solid walls. The support structure 12 is illustrated as being generally cylindrical in nature, however, the support structure 12 may have any other geometric shape with a generally vertical axis, for example, conical, elliptical, hourglass shaped or even a multilateral structure that serves the same function. The diameter or width of the support structure 12 and its height will vary depending on the material processing and work to be done.

The material conveyance 16 may be any apparatus or structure that is effective to support the material 21 as it moves along the desired generally vertically downward path. The material conveyance 16 may be a conveyor which is nonpowered, nonmoving, inclined, and with a smooth surface or which is nonpowered with rotating rollers forming the material flow path. In the above embodiments, gravity is effective to move the material 21 along the conveyor. Alternatively, the material conveyance 16 may be a powered device with rotating rollers or a moving belt which is directed along the material flow path. The material conveyance 16 may further provide subjacent support for the material 21 or may suspend the material 21 as from an overhead chain.

The material flow path is shown as having every point along the length of the path at a different elevation. However, at the points where a source of material 20 and workstations 22, 24 are adjacent the material conveyance 16 it may be desirable to adjust the rate of material flow and/or queue the material. Therefore, the slope of the material conveyance 16 may vary at the points where material 21 is received or processed. For example, by reducing the slope of the material conveyance 16, the rate of material flow along the path may be reduced and by bringing the slope to a horizontal, the advance of material 21 along the material conveyance 16 may be stopped or the material may be queued at that point. Therefore, the continued flow of material along the material flow path may be controlled by a worker or a machine processing the material 21 at workstations 22, 24. However, even though there may be small lengths along the material flow path that have a horizontal or even an upward inclination, the material flow path as a whole extends in a vertically downward direction.

The source of materials 20 may be located on the inside of the material conveyance 16 as shown or on the outside. Therefore, the support structure 12 may be hollow as shown or a solid structure. Mechanisms for moving material 21 to a point adjacent the material conveyance 16 are well known as are mechanisms for supplying the material 21 from the entry point to the material conveyance 16 itself. The material processing system 10 may have any number of sources of material 20. However, generally, different sources of material will be located at different vertical elevations.

Similarly, the material processing system 10 may have any number of workstations 22, 24; and the different workstations will be located at different vertical elevations. The material processing may occur as material 21 passes the workstation 22, 24 on the material conveyance 16. Alternatively, the material may be removed from the material conveyance 16 and processed at a processing station immediately adjacent the material conveyance 16 at the workstations 22, 24.

While the present invention has been set forth by a description of the embodiment in considerable detail, it is not intended to restrict or in any way limit the claims to such detail. Additional advantages and modifications will readily appear to those who are skilled in the art. For example, the material flow path of the material working system 10 shown in the FIG. a moves material in a generally vertically downward direction. Alternatively, as shown by the second material working system 30, the material may have a material flow path 32 extending in a generally vertically upward direction. In that case, the material may be discharged at an upper end 34 of the material flow path. Gravity may then be used to bring the material to a lower elevation along a return path or along the material flow path 18 such as that provided by the first material working system 10 connected to second first system 30.

The workstations 22, 24 at which work is performed may be located on either side of the material flow path, that is, either inside the support structure 12 or frame or outside the outer boundary of the material flow path.

Alternative to the structure shown 12 in which the material conveyance 16 is shown on the outer periphery of a support structure. The material conveyance 16 may also be located on the inside of peripheral boundary of the support structure 12. The material flow path may also have a small pitch or incline in a generally radially direction which will tend to direct the material 21 toward the center of the support structure. The material conveyance may also have edge rails or other devices that are well known in the conveyor art to help guide and direct the material as it moves down the material flow path.

The invention in its broadest aspects is therefore not limited to the specific details shown and described. Accordingly, departures may be made from such details without departing from the spirit and scope of the invention.

What is claimed is:

1. A material working system comprising:
   a support structure having a generally vertical central longitudinal axis;
   a generally helical material conveyance connected to the support structure and extending about the longitudinal axis of the support structure;
   a material entry point immediately adjacent the generally helical material conveyance at a first elevation for providing material to the generally helical material conveyance;
   a material exit point immediately adjacent the generally helical material conveyance at a second different elevation providing a discharge for the material from the generally helical material conveyance; and
   at least two workstations located immediately adjacent the generally helical material conveyance between the material entry point and the material exit point, each of the work stations having a different elevation from the other workstation and the first and the second elevations.

2. The material working system of claim 1 wherein the support structure is a generally cylindrical structure.

3. The material working system of claim 1 further comprising a plurality of sources of materials adjacent the material conveyance, each source of materials having a different vertical elevation.

4. A material working system comprising:
   a support frame having a peripheral boundary extending in a generally vertical direction defined by a locus of peripheral points on the frame;

a material conveyance connected to the support frame and having a length extending around the peripheral boundary of the support frame between the entry point and the exit point, substantially every point along the length of the material conveyance having a different vertical elevation;

a material entry point at a first elevation immediately adjacent the material conveyance for providing a source of material to the material conveyance, a material exit point at a second different elevation immediately adjacent the material conveyance for providing a discharge for the material from the material conveyance; and at least two workstations located immediately adjacent the material conveyance between the material entry point and the material exit point, each of the work stations having a different elevation from the other workstation and the first and the second elevations.

5. A material working system comprising:

base;

a material conveyance connected to and winding around the base in a generally vertical direction, the material conveyance having successive increments of length extending between the entry point and the exit point, and substantially all of the successive increments of length having a change in elevation and a change in horizontal displacement;

a material entry point at a first elevation immediately adjacent the material conveyance for providing a source of material to the material conveyance, a material exit point at a second different elevation immediately adjacent the material conveyance for providing a discharge for the material from the material conveyance; and at least two workstations located immediately adjacent the material conveyance between the material entry point and the material exit point, each of the work stations having a different elevation from the other workstation and the first and the second elevations.

6. A method of performing work on a workpiece comprising:

supplying the workpiece to a material entry point of a conveyance at a first elevation;

moving the workpiece in a generally vertical direction along a substantially helical path of the conveyance from the first location to a first workstation having a second elevation different from the first elevation;

performing work on the workpiece at the first workstation;

moving the workpiece in the generally vertical direction along the substantially helical path of the conveyance from the first workstation to a second workstation having a third elevation different from the first and the second elevations;

performing work on the workpiece at the second workstation; and moving the workpiece in the generally vertical direction along the substantially helical path of the conveyance from the second workstation to a material exit point of the conveyance having a fourth elevation different from the first, the second and the third elevations.

7. The method of claim 6 wherein moving the workpiece in a generally vertical direction further comprising moving the workpiece in a generally vertically downward direction.

8. The method of claim 6 wherein moving the workpiece in a generally vertical direction further comprising moving the workpiece in a generally vertically upward direction.

9. A method of performing work on material comprising:

supplying the material to a material entry location of a conveyance having a first elevation;

moving the material along a curved path of the conveyance in a generally vertical direction from the material entry location to a first workstation having a second elevation different from the first elevation, substantially every point along the curved path having a different vertical elevation;

performing work on the material at the first workstation;

moving the material along the curved path of the conveyance in the generally vertical direction from the first workstation to a second workstation having a third elevation different from the first and the second elevations;

performing work on the material at the second workstation; and moving the material along the curved path of the conveyance in the generally vertical direction from the second workstation to a material exit point having a fourth elevation different from the first, the second and the third elevations.

10. The method of claim 9 wherein moving the material in a generally vertical direction further comprising moving the material in a generally vertically downward direction.

11. The method of claim 9 wherein moving the material in a generally vertical direction further comprising moving the material in a generally vertically upward direction.

12. A method of performing work on material comprising:

supplying material to a material entry location of a conveyance having a first elevation;

moving the material along a winding inclined path of the conveyance in a generally vertical direction from the material entry location to a first workstation having a second elevation different from the first elevation, the winding inclined path having successive increments of length and each successive increment of length having a change in elevation and a change in horizontal displacement;

performing work on the material at the first workstation;

moving the material along the winding inclined path of the conveyance in the generally vertical direction from the first workstation to a second workstation having a third elevation different from the first and the second elevations;

performing work on the material at the second workstation;

moving the material along the winding inclined path of the conveyance in the generally vertical direction from the second workstation to a material exit point having a fourth elevation different from the first, the second and the third elevations.

13. The method of claim 12 wherein moving the material in a generally vertical direction further comprising moving the material in a generally vertically downward direction.

14. The method of claim 12 wherein moving the material in a generally vertical direction further comprises moving the material in a generally vertically upward direction.

* * * * *

UNITED STATES PATENT AND TRADEMARK OFFICE
CERTIFICATE OF CORRECTION

PATENT NO. : 5,447,223
DATED : September 5, 1995
INVENTOR(S) : Basab Bijay Dasgupta It is certified that error appears in the above-indentified patent and that said Letters Patent is hereby corrected as shown below:

In column 4, line 4, delete "a".

Signed and Sealed this

Twentieth Day of August, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,447,223
DATED : September 5, 1995
INVENTOR(S) : Basab B. Dasgupta It is certified that error appears in the above-identified patent and that said Letters Patent is hereby corrected as shown below:

On title page, item [19] and item [75]
    Delete "Dasqupta" and insert --Dasgupta--.

Signed and Sealed this

Twenty-fourth Day of February, 1998

Attest:

BRUCE LEHMAN

Attesting Officer      Commissioner of Patents and Trademarks